United States Patent [19]

Pham et al.

[11] Patent Number: 4,808,692

[45] Date of Patent: Feb. 28, 1989

[54] PREPARATION OF ADVANCED EPOXY RESINS FROM EPOXY RESINS AND DIHYDRIC PHENOLS IN THE PRESENCE OF PHOSPHONIUM COMPOUNDS

[75] Inventors: Ha Q. Pham, Richwood; Loan A. Ho, Lake Jackson, both of Tex.

[73] Assignee: The Dow Chemical Company, Midland, Mich.

[21] Appl. No.: 157,671

[22] Filed: Feb. 18, 1988

[51] Int. Cl.⁴ .............................................. C08G 59/02
[52] U.S. Cl. ..................................... 528/89; 528/104; 252/182.23; 252/182.27; 525/480
[58] Field of Search ................. 528/89, 104; 525/480; 252/182.23, 182.27

[56] References Cited

U.S. PATENT DOCUMENTS

| | | | |
|---|---|---|---|
| 3,477,990 | 11/1969 | Dante et al. | 260/47 |
| 3,738,862 | 6/1973 | Klarquist et al. | 117/126 GE |
| 3,948,855 | 4/1976 | Perry | 260/47 EP |
| 4,302,574 | 11/1981 | Doorakian et al. | 528/89 |
| 4,320,222 | 3/1982 | Lopez | 528/89 |
| 4,354,015 | 10/1982 | Doorakian et al. | 528/89 |
| 4,366,295 | 12/1982 | Tyler, Jr. et al. | 525/482 |
| 4,725,652 | 2/1988 | Bertram et al. | 528/89 X |

Primary Examiner—Earl Nielsen

[57] ABSTRACT

Advanced epoxy resins are prepared from glycidyl ethers of bisphenols or biphenols in the presence of cycloalkyl triphenyl phosphonium catalysts.

24 Claims, No Drawings

PREPARATION OF ADVANCED EPOXY RESINS FROM EPOXY RESINS AND DIHYDRIC PHENOLS IN THE PRESENCE OF PHOSPHONIUM COMPOUNDS

FIELD OF THE INVENTION

The present invention conerns the preparation of high molecular weight epoxy resins by reacting low molecular weight epoxy resins with a dihydric phenol in the presence of certain phosphonium compounds.

BACKGROUND OF THE INVENTION

High molecular weight epoxy resins have been prepared by reacting low molecular weight epoxy resins with dihydric phenols in the presence of phosphonium catalysts such as disclosed by Dante and Parry in U.S. Pat. No. 3,477,990 and by Perry in U.S. Pat. No. 3,948,855. While the phosphonium halide and carboxylate complex catalysts disclosed therein do indeed prepare high molecular weight epoxy resins, it would be desirable to be able to prepare high molecular weight resins with certain improved properties in the process employed to produce them and/or in the products so produced.

In the production of high molecular weight resins, it is often desirable to employ temperatures in excess of 200° C. so that the viscous products can be physically agitated or transferred. However, at these temperatures, the conventional phosphonium catalysts are deactivated prematurely, resulting in incomplete reaction and products containing high levels of unreacted phenolic hydroxyl groups and low equivalent weight or low molecular weight products are produced.

It would be desirable to employ a process using a catalyst which is more active at elevated temperatures so that for the same ratio of reactants employed, higher equivalent weight or molecular weight epoxy resins can be produced which contain lower amounts of residual or unreacted phenolic hydroxyl groups.

Also, one convenient method for packaging epoxy resins which are to be advanced into higher molecular weight epoxy resins is to mix the low molecular weight epoxy resin with the catalyst; however, with the conventional phosphonium catalysts, upon prolonged storage at elevated temperatures, the catalyst tends to become deactivated or at a minimum loose its activity. It would also be desirable to employ a catalyst in these precatalyzed packages or mixtures which does not become deactivated during storage at elevated temperatures or at a minimum does not loose as much of its activity at elevated temperatures.

SUMMARY OF THE INVENTION

One aspect of the present invention pertains to an improvement in a precatalyzed epoxy resin composition which is essentially free of epoxy resin curing agents and which contains (A) at least one relatively low molecular weight epoxy resin having an average of more than one but not more than about 2 vicinal epoxy groups per molecule; and (B) at least one phosphonium catalyst; wherein the improvement resides in employing as the phosphonium catalyst, a cycloalkyl triphenyl phosphonium compound.

Another aspect of the present invention pertains to an improvement in a process for the preparation of advanced epoxy resins by reacting (A) at least one epoxy resin having an average of more than one but not more than about 2 vicinal epoxy groups per molecule; with (B) at least one compound having about 2 aromatic hydroxyl groups per molecule; in the presence of (C) a phosphonium catalyst; wherein the improvement resides in employing as the phosphonium catalysts, a cycloalkyl triphenyl phosphonium compound.

DETAILED DESCRIPTION OF THE INVENTION

In the precatalyzed epoxy resin compositions of the present invention, the phosphonium compound is employed in an amount suitably from about 0.0001 to about 10, more suitably from about 0.05 to about 1, most suitably from about 0.1 to about 0.5 percent by weight based upon the weight of the epoxy resin.

Relatively high molecular weight epoxy resins are prepared by reacting a relatively low molecular weight epoxy resin and a phenolic hydroxyl containing compound in the presence of the phosphonium catalyst at temperatures suitably from about 50° C. to about 280° C., more suitably from about 100° C. to about 240° C., most suitably from about 120° C. to about 220° C. Atmospheric, subatmospheric or superatmospheric pressures can be employed. However, the reaction is particularly suitably conducted at pressures of from about 1 psig to about 150 psig, more suitably from about 5 psig to about 80 psig, most suitably from about 10 psig to about 20 psig. The reaction is conducted for a time to complete the reaction; however, times suitably from about 0.5 to about 20, more suitably from about 1 to about 8, more suitably from about 2 to about 5 hours can be employed.

The epoxy resin and the compound having about 2 phenolic hydroxyl groups per molecule are employed in amounts which provide a ratio of phenolic hydroxyl groups to epoxide groups suitably from about 0.01:1 to about 2:1, more suitably from about 0.2:1 to about 1.5:1, more suitably from about 0.5:1 to about 1:1.

The phosphonium catalyst is employed in catalytically sufficient amounts to catalyze the reaction between the epoxide group and the phenolic hydroxide group. Usually, these amounts are suitably from about 0.0001 to about 0.1, more suitably from about 0.0005 to about 0.05, most suitably from about 0.001 to about 0.005 moles of catalyst per mole of the relatively low molecular weight epoxy resin.

Any phosphonium compound which has three phenyl groups attached to the phosphorus atom and one cycloalkyl group attached to the phosphorus atom can be employed herein. It does not matter what the anion portion of the phosphonium compound happens to be. Particularly suitable anions include, for example, the halides such as, for example, chloride, bromide or iodide; the carboxylates such as, for example, formate, acetate, oxalate, trifluoroacetate, carboxylate.carboxylic acid complexes such as, for example, acetate.acetic acid complex; conjugate bases of inorganic acids such as, for example, bicarbonate, tetrafluoroborate or bisphosphate; and conjugate bases of phenols, such as, for example, phenate or an anion derived from a bisphenol or biphenol such as, for example, bisphenol A or bisphenol F, combinations thereof and the like.

The cycloalkyl triphenyl phosphonium catalysts which can be employed herein include, for example those represented by the following formula I Formula I

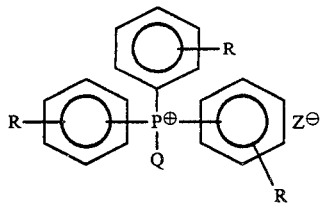

wherein Q is a cycloalkyl or alkyl or halo substituted cycloalkyl group having suitably from about 3 to about 8, more suitably from about 4 to about 7, most suitably from 5 to about 6 carbon atoms in the cycloalkyl ring; each R is independently hydrogen, a halogen, or a hydrocarbyl group having suitably from 1 to about 12, more suitably from 1 to about 6, most suitably from 1 to about 3, carbon atoms; Z is an anion such as, for example, halige such as, for example, chloride, bromide or iodide; carboxylate such as, for example, formate, acetate, oxalate, trifluoroacetate, carboxylate.carboxylic acid complex such as, for example, acetate.acetic acid complex; conjugate base of an inorganic acid such as, for example, bicarbonate, tetrafluoroborate or biphosphate and a conjugate base of a phenol, such as, for example, phenate or an anion derived from a bisphenol or biphenol such as, for example, bisphenol A or bisphenol F, combinations thereof and the like.

The term hydrocarbyl as employed herein means any aliphatic, cycloaliphatic, aromatic, aryl substituted aliphatic or cycloaliphatic, or aliphatic or cycloaliphatic substituted aromatic groups. Likewise, the term hydrocarbyloxy means a hydrocarbyl group having an oxygen linkage between it and the object to which it is attached.

Particularly suitable catalysts include, for example, cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium heptanoate, cyclopropyl triphenyl phosphonium oxalate, cyclobutyl triphenyl phosphonium iodide, cyclobutyl triphenyl phosphonium bromide, cyclobutyl triphenyl phosphonium chloride, cyclobutyl triphenyl phosphonium acetate, cyclobutyl triphenyl phosphonium acetate.acetic acid complex, cyclobutyl triphenyl phosphonium phosphate, cyclobutyl triphenyl phosphonium heptanoate, cyclobutyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium heptanoate, cyclopentyl triphenyl phosphonium oxalate, cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium heptanoate, cyclopropyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium heptanoate, cycloheptyl triphenyl phosphonium oxalate, cyclooctyl triphenyl phosphonium iodide, cyclooctyl triphenyl phosphonium bromide, cyclooctyl triphenyl phosphonium chloride, cyclooctyl triphenyl phosphonium acetate, cyclooctyl triphenyl phosphonium acetate.acetic acid complex, cyclooctyl triphenyl phosphonium phosphate, cyclooctyl triphenyl phosphonium heptanoate, cyclooctyl triphenyl phosphonium oxalate, combinations thereof and the like.

The catalysts can be readily prepared by reacting triphenyl or substituted triphenyl phosphines with cycloalkylhalides. The catalysts are commercially available and general procedures and references for their preparation are given in *Organo Phosphorous Compounds*, by G. M. Kosolapoff, John Wiley & Sons, 1958 and in U.S. Pat. No. 3,341,580, all of which are incorporated herein by reference. Particularly suitable cycloalkyl halides which can be employed include, for example, cyclopropyl, cyclobutyl, cyclopentyl, cyclohexyl, cycloheptyl and cyclooctyl chlorides, bromides, iodides and the like.

These catalysts are believed to be particularly suitable for preparing advanced epoxy resins by the extruder process disclosed by B. W Heinemeyer and S. D. Tatum in U.S. Pat. No. 4,612,156 which is incorporated herein by reference.

Suitable epoxy resins which can be employed herein in the precatalyzed compositions and in the preparation of the advanced epoxy resins include, for example, the relatively low molecular weight epoxy resins represented by the following formulas II or III Formula II

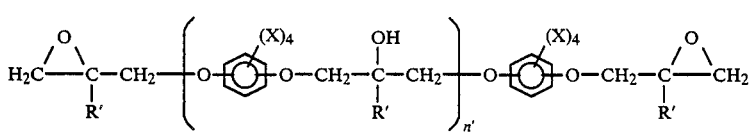

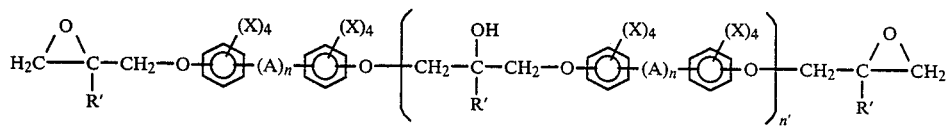

Formula III wherein each A is independently a divalent hydrocarbyl or substituted hydrocarbyl group having suitably from 1 to about 12, more suitably from 1 to about 6, most suitably from 1 to about 3, carbon atoms; each R' is independently hydrogen or an alkyl group having from 1 to about 4 carbon atoms; each X is independently hydrogen or a hydrocarbyl or substituted hydrocarbyl or hydrocarbyloxy or substituted hydrocarbyloxy group having suitably from 1 to about 12, more suitably from 1 to about 6, most suitably from 1 to about 3, carbon atoms or a halogen atom, particularly chlorine or bromine; each n is independently has a value of zero or 1; and n' has an average value from zero to about 0.5, particularly from about 0.035 to about 0.1.

Particularly suitable relatively low molecular weight epoxy resins which can be employed herein include, for example, the diglycidyl ethers of such dihydric phenolic compounds as resorcinol, catechol, hydroquinone, biphenol, bisphenol A, bisphenol F, bisphenol K, bisphenol S, combinations thereof and the like.

Suitable compounds having about 2 phenolic hydroxyl groups per molecule which can be employed herein include, for example, those represented by the following formulas IV or V

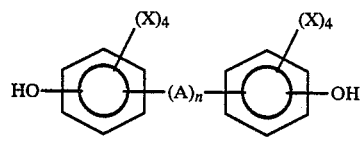

Formula IV

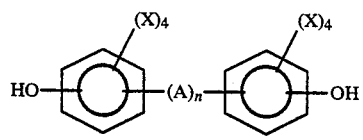

Formula V wherein A, X and n are as defined above. Particularly suitable compounds having about 2 phenolic hydroxyl groups per molecule include, for example, resorcinol, catechol, hydroquinone, biphenol, bisphenol A, bisphenol F, bisphenol K, bisphenol S, combinations thereof and the like.

The resultant advanced high molecular weight epoxy resins which are produced by the process of the present invention can be represented by the above described formulas II and III wherein A, R',X and n are as previously defined and n' has an average value suitably from about 2 about 40 and above, more suitably from about 2.5 to about 31, most suitably from about 3 to about 25.

If desired, the reaction can be conducted in the presence of such solvents as ketones, alcohols, hydrocarbons, halogenated aliphatic compounds, glycol ethers, amides, sulfoxides, combinations thereof and the like. Particularly suitable solvents include, for example, acetone methyl, ethyl ketone, xylene, toluene, ethanol, isopropanol, ethylene dichloride, propylene glycol methyl ether, ethylene glycol n-butyl ether, ethylene glycol ether ether, dimethylformamide, dimethylsulfoxide, combinations thereof and the like. The solvents, when employed, are usually employed in amounts suitably from about 0.5 to about 90, more suitably from about 1 to about 80, most suitably from about 3 to about 50, percent by weight based upon the total weight of the nonvolatile components.

The high molecular weight epoxy resins prepared by the process of the present invention can be employed in the preparation of coating formulations, casting formulations, laminating varnishes, encapsulation formulations, and the like.

The following examples are illustrative of the invention, but are not to be construed as to limiting the scope thereof in any manner.

EXAMPLE 1

Into a 1 liter, 5-necked glass reactor equipped with a mechanical stirrer, a thermometer connected to a temperature controller and a heating mantel, is charged 395.9 g (2.191 equiv.) of a diglycidyl ether of bisphenol A having an epoxide equivalent weight (EEW) of 180.7. After purging the reactor with nitrogen and warming the resin to 80° C., 204.1 g (1.790 equiv.) of bisphenol A is added and the contents mixed for 15 minutes at 80° C. Then 0.96 g of 24.2 weight percent of cyclopentyl triphenyl phosphonium bromide, cyclo $C_5$ TPP Br, (0.56 milliequivalent or millimole) in methanol is added to the epoxy resin/bisphenol A slurry and the temperature is gradually increased to 150° C. over a period of 45 minutes. At this time, the heating is turned off and an exotherm is allowed to take place at 190° C. During this time, air cooling is used to control the exotherm temperature to less than 200° C. The cook temperature is maintained at 190° C. for 4 hours while samples are taken for product analyses. After reacting for 4 hours, the resin is poured out and flaked on aluminum foil. The product analyses and catalyst activity are reported in Tables I and II, respectively.

EXAMPLE 2

The procedure of Example 1 is followed except that 1.01 g (0.56 milliequivalent or millimole) of a 22.32 weight percent methanolic solution of cyclohexyl triphenyl phosphonium bromide, cyclo $C_6$ TPP Br, is employed as the catalyst. The product analysis and catalyst activity are reported in Tables I and II, respectively.

EXAMPLE 3

The procedure of Example 1 is followed except that 0.46 g (0.56 milliequivalent or millimole) of a 55.51 weight percent methanolic solution of cyclopentyl triphenyl phosphonium acetate.acetic acid complex, cyclo $C_5$ TPP Ac.AcA, is employed as the catalyst. The product analysis and catalyst activity are reported in Tables I and II, respectively.

EXAMPLE 4

The procedure of Example 1 is followed except that 0.96 g (0.56 milliequivalent or millimole) of a 23.45 weight percent methanolic solution of cyclopropyl triphenyl phosphonium bromide, cyclo C₃ TPP Br, is employed as the catalyst. The product analysis and catalyst activity are reported in Tables I and II, respectively.

EXAMPLE 5

The procedure of Example 1 is followed except that 0.92 g (0.56 milliequivalent or millimole) of a 26.78 weight percent methanolic solution of cycloheptyl triphenyl phosphonium bromide, cyclo C₇ TPP Br, is employed as the catalyst. The product analysis and catalyst activity are reported in Tables I and II, respectively.

COMPARATIVE EXPERIMENT A

The procedure of Example 1 is followed except that 0.7 g (0.56 milliequivalent or millimole) of a 29.86 weight percent methanolic solution of ethyl triphenyl phosphonium bromide, ethyl TPP Br, is employed as the catalyst. The product analysis and catalyst activity are reported in Tables I and II, respectively.

COMPARATIVE EXPERIMENT B

The procedure of Example 1 is followed except that 0.83 g (0.56 milliequivalent or millimole) of a 28.35 weight percent methanolic solution of ethyl triphenyl phosphonium iodide, ethyl TPP I, is employed as the catalyst. The product analysis and catalyst activity are reported in Tables I and II, respectively.

COMPARATIVE EXPERIMENT C

The procedure of Example 1 is followed except that 0.33 g (0.56 milliequivalent or millimole) of a 70 weight percent methanolic solution of ethyl triphenyl phosphonium acetate.acetic acid complex, ethyl TPP Ac.AcA is employed as the catalyst. The product analysis and catalyst activity are reported in Table I and II, respectively.

COMPARATIVE EXPERIMENT D

The procedure of Example 1 is followed except that 0.7 g (0.56 milliequivalent or millimole) of a 28.87 weight percent methanolic solution of methyl triphenyl phosphonium bromide, methyl TPP Br, is employed as the catalyst. The product analysis and catalyst activity are reported in Tables I and II, respectively.

COMPARATIVE EXPERIMENT E

The procedure of Example 1 is followed except that 0.78 g (0.56 milliequivalent or millimore) of a 28.96 weight percent methanolic solution of butyl triphenyl phosphonium bromide, butyl TPP Br, is employed as the catalyst. The product analysis and catalyst activity are reported in Tables I and II, respectively.

COMPARATIVE EXPERIMENT F

The procedure of Example 1 is followed except that 1.04 g (0.56 milliequivalent or millimore) of a 30.65 weight percent methanolic solution of hexadecyl triphenyl phosphonium bromide, hexadecyl TPP Br, is employed as the catalyst. The product analysis and catalyst activity are reported in Table I and II. respectively.

COMPARATIVE EXPERIMENT G

The procedure of Example 1 is followed except that 0.84 g (0.56 milliequivalent or millimole) of a 28.13 weight percent methanolic solution of tetraphenyl phosphonium bromide, tetra phenyl P Br, is employed as the catalyst. The product analysis and catalyst activity are reported in Tables I and II, respectively.

EXAMPLE 6

The procedure of Example 1 is employed except that 350 g (1.937 equiv.) of the diglycidyl ether of bisphenol A having an EEW of 180.7; 203.2 g (1.782 equiv.) of bisphenol A and 1.64 g (0.86 milliequiv. or millimole) of 21.52 weight percent solution of cyclopentyl triphenyl phosphonium bromide, cyclo C₅ TPP Br, in methanol are employed. Heating is applied to raise the temperature gradually to 150° C. and the exotherm temperature is 210° C. to 215° C. The cook temperature is 215° C. and is maintained for 4 hours. The product analysis and catalyst activity are reported in Tables I and II, respectively.

COMPARATIVE EXPERIMENT H

The procedure of Example 6 is followed except that 0.5 g (0.86 milliequivalent or millimole) of a 70 weight percent methanolic solution of ethyl triphenyl phosphonium acetate.acetic acid complex, Ethyl TPP Ac.AcA, is employed as the catalyst. The product analysis and catalyst activity are reported in Tables I and II, respectively.

COMPARATIVE EXPERIMENT I

The procedure of Example 6 is followed except that 1.27 g (0.86 milliequivalent or millimole) of a 28.35 weight percent methanolic solution of ethyl triphenyl phosphonium iodide, ethyl TPP I, is employed as the catalyst. The product analysis and catalyst activity are reported in tables I and II, respectively.

The percent active catalyst is determined by dissolving 0.25 g of resin sample in methylene chloride to a total volume of 25 ml. To a 5 ml aliquot is added 15 ml of methylene chloride and 1 ml of a 0.1% aqueous solution o methyl orange indicator in a 2 oz (59.15 ml) bottle. This mixture is shaken for one minutes, then allowed to stand for 5 minutes. A 10 ml aliquot is filtered into a Klett tube, which is placed in a Klett colorimeter. The colorimeter measures the color intensity which is directly proportional to active catalyst (phosphonium cation) levels. Catalyst concentration is then calculated based on the ppm active catalyst per Klett unit.

The EEW is determined by potentiometric titration of the epoxide group with hydrogen bromide generated in situ by the reaction of perchloric acid with tetraammonium bromide in acetic acid solution.

The Viscosity is determined by means of an I.C.I. cone and plate viscometer at 200° C.

The residual phenolic hydroxyl content is determined by a spectroscopic procedure in which the phenolic OH is converted to its phenate salt and the absorbance measured with an ultraviolet spectrophotometer.

The molecular weight is determine by gel permeation chromatography using a Waters 150 gel permeation chromatography, GPC, equipped with two Zorbax PSM 60/100 columns in series. The solvent is tetrahydrofuran and the flow rate is 1 ml/minute. Polystyrene resins are used as calibration standards.

TABLE I

PROPERTIES OF HIGH MOLECULAR WEIGHT EPOXY RESIN PRODUCT

| Ex. or Comp. Expt. Desig. | CATALYST EMPLOYED | EEW | Viscosity cps (Pa.s) | Residual Phenolic OH, ppm | Mw[a] | Mw/Mn[b] |
|---|---|---|---|---|---|---|
| 1 | CycloC$_5$ TPP Br | 2,207 | 20,000 (20) | 346 | 12,891 | 3.48 |
| 2 | CycloC$_6$ TPP Br | 2,216 | 21,500 (21.5) | 384 | 13,227 | 3.68 |
| 3 | CycloC$_5$ TPP Ac.AcA | 2,172 | 19,000 (19) | 390 | 12,201 | 3.48 |
| 4 | CycloC$_3$ TPP Br | 2,134 | 17,500 (17.5) | 426 | 11,765 | 3.40 |
| 5 | CycloC$_7$ TPP Br | 2,157 | 18,000 (18) | 382 | 12,054 | 3.42 |
| A* | Ethyl TPP Br | 2,089 | 14,000 (14) | 633 | 10,914 | 3.40 |
| B* | Ethyl TPP I | 2,133 | 14,000 (14) | 687 | 10,942 | 3.42 |
| C* | Ethyl TPP Ac.AcA | 2,094 | 14,500 (14.5) | 554 | 10,832 | 3.40 |
| D* | Methyl TPP Br | 2,053 | 12,500 (12.5) | 886 | 10,535 | 3.40 |
| E* | Butyl TPP Br | 2,087 | 14,500 (14.5) | 622 | 10,990 | 3.44 |
| F* | Hexadecyl TPP Br | 2,065 | 12,000 (12) | 751 | 10,886 | 3.37 |
| G* | Tetraphenyl P Br | 1,955 | 8,000 (8) | 988 | 9,325 | 3.14 |
| 6 | CycloC$_5$ TPP Br | 3,811 | — | 956 | 24,009 | 4.2 |
| H* | Ethyl TPP Ac.AcA | 3,082 | — | 1,740 | 15,238 | 3.60 |
| I* | Ethyl TPP I | 3,344 | — | 1,870 | 14,567 | 3.43 |

*Not an example of the invention.
[a]Weight average molecular weight.
[b]Weight average molecular weight ÷ number average molecular weight.

TABLE II

CATALYST ACTIVITY
% Active catalyst at the indicated minutes after exotherm

| Ex. or Comp. Expt. Desig. | CATALYST EMPLOYED | 30 min. | 60 min. | 120 min. | 180 min. | 240 min. |
|---|---|---|---|---|---|---|
| 1 | CycloC$_5$ TPP Br | 66 | 52 | 32 | 26 | 17 |
| 2 | CycloC$_6$ TPP Br | 64 | 54 | 41 | 32 | 30 |
| 3 | CycloC$_5$ TPP Ac.AcA | 56 | 30 | 16 | 12 | ND[a] |
| 4 | CycloC$_3$ TPP Br | 52 | 25 | 14 | ND[a] | ND[a] |
| 5 | CycloC$_7$ TPP Br | 64 | 43 | 26 | 20 | 18 |
| A* | Ethyl TPP Br | 38 | 17 | ND[a] | ND[a] | ND[a] |
| B* | Ethyl TPP I | 23 | ND[a] | ND[a] | ND[a] | ND[a] |
| C* | Ethyl TPP Ac.AcA | 17 | ND[a] | ND[a] | ND[a] | ND[a] |
| D* | Methyl TPP Br | 17 | ND[a] | ND[a] | ND[a] | ND[a] |
| E* | Butyl TPP Br | 33 | 15 | ND[a] | ND[a] | ND[a] |
| F* | Hexadecyl TPP Br | 25 | ND[a] | ND[a] | ND[a] | ND[a] |
| G* | Tetraphenyl P Br | ND[a] | ND[a] | ND[a] | ND[a] | ND[a] |

CATALYST ACTIVITY
% Active catalyst at the indicated minutes after exotherm

| Ex. or Comp. Expt. Desig. | CATALYST EMPLOYED | 5 min. | 15 min. | 30 min. | 60 min. | 120 min. |
|---|---|---|---|---|---|---|
| 6 | CycloC$_5$ TPP Br | 76 | 44 | 32 | 14 | ND[a] |
| H* | Ethyl TPP Ac.AcA | 36 | 7 | ND[a] | ND[a] | ND[a] |
| I* | Ethyl TPP I | 44 | 18 | ND[a] | ND[a] | ND[a] |

*Not an example of the invention.
[a]ND is Non-Detectable.

EXAMPLE 7 and COMPARATIVE EXPERIMENTS J & K

A series of stability tests are conducted on a liquid epoxy resin precatalyzed with various phosphonium catalysts. In each of the Examples and Comparative Experiments, 960 grams of a diglycidyl ether of bisphenol A having a percent epoxide of 23.6% and an epoxide equivalent weight of 182.2 and containing 91 ppm hydrolyzable chloride and 1380 ppm total chloride is diluted with 40 grams of xylene to reduce the viscosity. After the epoxy resin/xylene mixture is thoroughly agitated, the phosphonium catalyst is added in an amount to provide 1000 ppm of catalyst by weight based on the weight of the epoxy resin. The precatalyzed epoxy resin mixture is then agitated using a mechanical mixer and subjected to heat aging in a convection oven controlled at a temperature of 50° C. The catalytic activity of the catalyst remaining after heat aaging over a period of time is reported in Table III.

TABLE III

| Ex. or Comp. Expt. Desig. | CATALYST EMPLOYED Type | % in Methanol | Wt. % cat. soln. used | % ACTIVE CATALYST AT 50° C. 0hr[a] | 24 Hrs. | 48 Hrs. |
|---|---|---|---|---|---|---|
| J* | Ethyl TPP Ac.AcA[b] | 70 | 1.43 | 100 | 52 | 40 |
| K* | Ethyl TPP Phosp.[c] | 30 | 3.33 | 100 | 82 | 68 |
| 4 | CycloC$_5$ TPPBr[d] | 25 | 4.00 | 100 | 100 | 100 |

*Not an example of the invention.
[a]0hr is the time the pre-catalyzed resin samples are placed in the 50° C. oven.
[b]cEthyl triphenyl phosphonium acetate.acetic acid complex.
[c]Ethyl triphenyl phosphonium phosphate.
[d]Cyclopentyl triphenyl phosphonium bromide.

EXAMPLES 8, 9 & 10 and COMP.EXPERIMENTS L, M, N & O

The procedure of Example 7 is employed except that the stability test is conducted at 90° C. instead of 50° C. A diglycidyl ether of bisphenol A liquid epoxy resin containing 22.9% epoxide (187.1 EEW), 228 ppm hydrolyzable chloride and 2,650 ppm total chloride is used in these experiments. The results are given in Table IV.

TABLE IV

| Ex. or Comp. Expt. Desig. | CATALYST EMPLOYED | | | % ACTIVE CATALYST AT 90° C. | | | | |
|---|---|---|---|---|---|---|---|---|
| | Type | % In Methanol | Wt. % cat. soln. used | 0hr[a] | 6 Hrs. | 24 Hrs. | 48 Hrs. | 72 Hrs. |
| 8 | CycloC$_5$ TPPBr[b] | 25 | 4.00 | 100 | 98 | 87 | 62 | 59 |
| L* | n-C$_5$ TPPBr[c] | 30 | 3.33 | 100 | 89 | 68 | 49 | 38 |
| 9 | CycloC$_7$ TPPBr[d] | 26.78 | 3.73 | 100 | 95 | 82 | 55 | 52 |
| M* | n-C$_7$ TPPBr[e] | 34.87 | 2.87 | 100 | 92 | 62 | 46 | 34 |
| N* | Ethyl TPP Ac.AcA[f] | 70 | 1.43 | 100 | 40 | 10 | 8 | 7 |
| O* | Ethyl TPP I[g] | 28.35 | 3.53 | 100 | 87 | 59 | 41 | 30 |
| 10 | CycloC$_5$ TPP Phosphate[h] | 20.5 | 4.87 | 100 | 100 | 100 | 97 | 94 |

*Not an example of the invention.
[a] 0hr is the time when the resin sample is placed in the 90° C. oven.
[b] Cyclopentyl triphenyl phosphonium bromide.
[c] n-pentyl triphenyl phosphonium bromide.
[d] Cycloheptyl triphenyl phosphonium bromide.
[e] n-heptyl triphenyl phosphonium bromide.
[f] Ethyl triphenyl phosphonium acetate.acetic acid complex.
[g] Ethyl triphenyl phosphonium iodide.
[h] Cyclopentyl triphenyl phosphonium phosphate.

What is claimed is:

1. In a precatalyzed epoxy resin composition which is essentially free of epoxy resin curing agents and which contains (A) at least one relatively low molecular weight epoxy resin having an average of more than one but not more than about 2 vicinal epoxy groups per molecule; and (B) at least one phosphonium catalyst; the improvement which comprises employing as the phosphonium catalyst, a cycloalkyl triphenyl phosphonium compound.

2. A precatalyzed epoxy resin composition of claim 1 wherein
   (a) the phosphonium catalyst, component (B), is employed in an amount of from about 0.001 to about 10 percent by weight based upon the weight of the epoxy resin, component (A);
   (b) component (A) is an epoxy resin or mixture of epoxy resins represented by the following formulas II or III

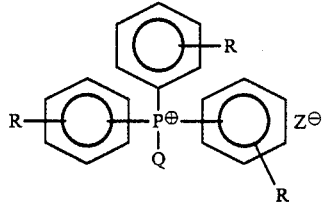

Formula I wherein Q is a cycloalkyl group or an alkyl substituted or halo substituted cycloalkyl group wherein the cycloalkyl ring contains from 3 to about 8 carbon atoms; each R is independently hydrogen, a halogen, or a hydrocarbyl group having from 1 to about 12 carbon atoms; Z is an anion.

3. A precatalyzed epoxy resin composition of claim 2 wherein

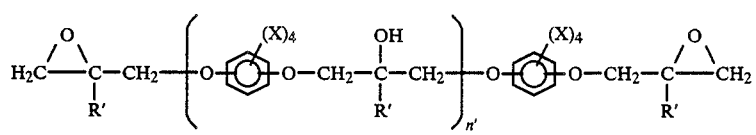

Formula II

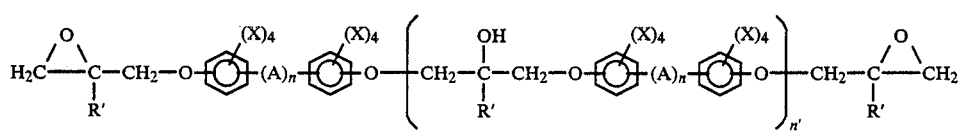

Formula III wherein each A is independently a divalent hydrocarbyl or substituted hydrocarbyl group having from 1 to about 12 carbon atoms; each R' is independently hydrogen or an alkyl group having from 1 to about 4 carbon atoms; each X is independently hydrogen or a hydrocarbyl or substituted hydrocarbyl or hydrocarbyloxy or substituted hydrocarbyloxy group having from 1 to about 12 carbon atoms or a halogen atom; each n is independently has a value of zero or 1; and n' has an average value from zero to about 0.5; and
   (c) the phosphonium catalyst, component (B) is represented by the following formula I (a) the phosphonium catalyst, component (B), is employed in an amount of from about 0.05 to about 1 percent by weight based upon the weight of the epoxy resin, component (A);
   (b) component (A) is an epoxy resin or mixture of epoxy resins represented by formula III wherein each A is independently a divalent hydrocarbyl or substituted hydrocarbyl group having from 1 to about 6 carbon atoms; each X is independently hydrogen or a hydrocarbyl or substituted hydrocarbyl or hydrocarbyloxy or substituted hydrocarbyloxy group having from 1 to about 6 carbon atoms, chlorine or bromine; and n' has an average value from about 0.035 to about 0.1; and
   (c) in formula I, Z is a halide, a carboxylate, a carboxylate.carboxyl acid complex, a conjugate base of an inorganic acid, a conjugate base of a phenol, or a combination thereof.

4. A precatalyzed epoxy resin composition of claim 3 wherein
(a) the phosphonium catalyst, component (B), is employed in an amount of from about 0.1 to about 0.5 percent by weight based upon the weight of the epoxy resin, component (A);
(b) component (A) is an epoxy resin or mixture of epoxy resins represented by formula III wherein each A is independently a divalent hydrocarbyl or substituted hydrocarbyl group having from 1 to about 3 carbon atoms; and each X is independently hydrogen or a hydrocarbyl or substituted hydrocarbyl or hydrocarbyloxy or substituted hydrocarbyloxy group having from 1 to about 3 carbon atoms, chlorine or bromine; and
(c) in formula I, Z is chloride, bromide iodide, acetate, acetate.acetic acid complex, or phosphate.

5. A precatalyzed epoxy resin composition of claim 1 wherein
(a) the epoxy resin, component (A), is a diglycidyl ether of bisphenol A, a diglycidyl ether of bisphenol F, a diglycidyl ether of bisphenol K, a diglycidyl ether of bisphenol S or a mixture of such glycidyl ethers; and
(b) the catalyst, component (B), is cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium oxalate, or any combination thereof.

6. A precatalyzed epoxy resin composition of claim 5 wherein
(a) the epoxy resin, component (A), is a diglycidyl ether of bisphenol A; and
(b) the catalyst, component (B), is cyclopentyl triphenyl phosphonium iodide, cyclopentyl triphenyl phosphonium bromide, cyclopentyl triphenyl phosphonium chloride, cyclopentyl triphenyl phosphonium acetate.acetic acid complex, cyclopentyl triphenyl phosphonium phosphate, cyclohexyl triphenyl phosphonium iodide, cyclohexyl triphenyl phosphonium bromide, cyclohexyl triphenyl phosphonium chloride, cyclohexyl triphenyl phosphonium acetate.acetic acid complex, cyclohexyl triphenyl phosphonium phosphate, or any combination thereof.

7. A precatalyzed epoxy resin composition of claim 2 wherein
(a) the epoxy resin, component (A), is a diglycidyl ether of bisphenol A, a diglycidyl ether of bisphenol F, a diglycidyl ether of bisphenol K, a diglycidyl ether of bisphenol S or a mixture of such glycidyl ethers; and
(b) the catalyst, component (B), is cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium oxalate, cyclohexyl triphenyl phosphonium iodide, cyclohexyl triphenyl phosphonium bromide cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium oxalate, or any combination thereof.

8. A precatalyzed epoxy resin composition of claim 7 wherein
(a) the epoxy resin, component (A) is a diglycidyl ether of bisphenol A; and
(b) the catalyst, component (B), is cyclopentyl triphenyl phosphonium iodide, cyclopentyl triphenyl phosphonium bromide, cyclopentyl triphenyl phosphonium chloride, cyclopentyl triphenyl phosphonium acetate.acetic acid complex, cyclopentyl triphenyl phosphonium phosphate, cyclohexyl triphenyl phosphonium iodide, cyclohexyl triphenyl phosphonium bromide, cyclohexyl triphenyl phosphonium chloride, cyclohexyl triphenyl phosphonium acetate.acetic acid complex, cyclohexyl triphenyl phosphonium phosphate, or any combination thereof.

9. A precatalyzed epoxy resin composition of claim 3 wherein
(a) the epoxy resin, component (A), is a diglycidyl ether of bisphenol A, a diglycidyl ether of bisphenol F, a diglycidyl ether of bisphenol K, a diglycidyl ether of bisphenol S or a mixture of such glycidyl ethers; and
(b) the catalyst, component (B), is cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium oxalate, or any combination thereof.

10. A precatalyzed epoxy resin composition of claim 9 wherein
(a) the epoxy resin, component (A), is a diglycidyl ether of bisphenol A; and
(b) the catalyst, component (B), is cyclopentyl triphenyl phosphonium iodide, cyclopentyl triphenyl phosphonium bromide, cyclopentyl triphenyl phosphonium chloride, cyclopentyl triphenyl phosphonium acetate.acetic acid complex, cyclopentyl triphenyl phosphonium phosphate, cyclohexyl triphenyl phosphonium iodide, cyclohexyl triphenyl phosphonium bromide, cyclohexyl triphenyl phosphonium chloride, cyclohexyl triphenyl phosphonium acetate.acetic acid complex, cyclohexyl triphenyl phosphonium phosphate, or any combination thereof.

11. A precatalyzed epoxy resin composition of claim 4 wherein
(a) the epoxy resin, component (A), is a diglycidyl ether of bisphenol A, a diglycidyl ether of bisphenol F, a diglycidyl ether of bisphenol K, a diglycidyl ether of bisphenol S or a mixture of such glycidyl ethers; and
(b) the catalyst, component (B), is cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium oxalate, or any combination thereof.

12. A precatalyzed epoxy resin composition of claim 11 wherein
(a) the epoxy resin, component (A), is a diglycidyl ether of bisphenol A; and
(b) the catalyst, component (B), is cyclopentyl triphenyl phosphonium iodide, cyclopentyl triphenyl phosphonium bromide, cyclopentyl triphenyl phosphonium chloride, cyclopentyl triphenyl phosphonium acetate.acetic acid complex, cyclopentyl triphenyl phosphonium phosphate, cyclohexyl triphenyl phosphonium iodide, cyclohexyl triphenyl phosphonium bromide, cyclohexyl triphenyl phosphonium chloride, cyclohexyl triphenyl phosphonium acetate.acetic acid complex, cyclohexyl triphenyl phosphonium phosphate, or any combination thereof.

13. In a process for the preparation of advanced epoxy resins by reacting (A) at least one epoxy resin having an average of more than one but not more than about 2 vicinal epoxy groups per molecule; with (B) at least one compound having about 2 aromatic hydroxyl groups per molecule; in the presence of (C) a triphenyl phosphonium catalyst; the improvement which comprises employing as the triphenyl phosphonium catalyst, a cycloalkyl triphenyl phosphonium compound.

14. A process of claim 13 wherein
(a) components (A) and (B) are employed in amounts which provide a ratio of phenolic hydroxyl groups to epoxy groups of from about 0.01:1 to about 2:1;
(b) the triphenyl phosphonium catalyst, component (C), is employed in an amount of fom about 0.0001 to about 0.1 mole of catalyst per mole of the epoxy resin, component (A);
(c) component (A) is an epoxy resin or mixture of epoxy resins represented by the following formulas II or III Formula II

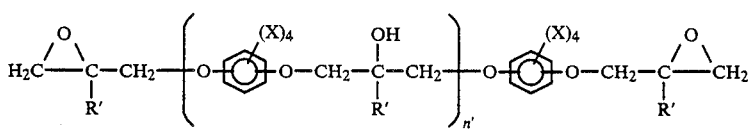

-continued

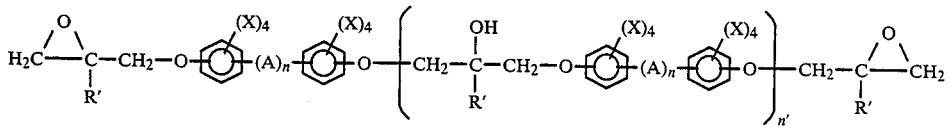

Formula III wherein each A is independently a divalent hydrocarbyl or substituted hydrocarbyl group having from 1 to about 12 carbon atoms; each R' is independently hydrogen or an alkyl group having from 1 to about 4 carbon atoms; each X is independently hydrogen or a hydrocarbyl or substituted hydrocarbyl or hydrocarbyloxy or substituted hydrocarbyloxy group having from 1 to about 12 carbon atoms or a halogen atom; each n is independently has a value of zero or 1; and n' has an average value from zero to about 0.5;

(d) the phenolic hydroxyl containing compound, component (B) is a compound or mixture of compounds represented by the following formulas IV or V

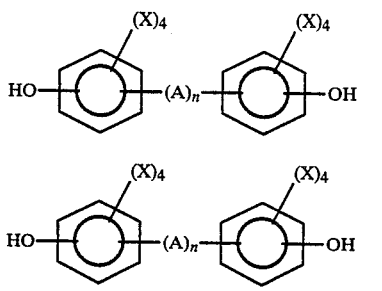

Formula IV

Formula V wherein A, X and n are as defined above; and (e) the triphenyl phosphonium catalyst, component (C) is represented by the following formula I

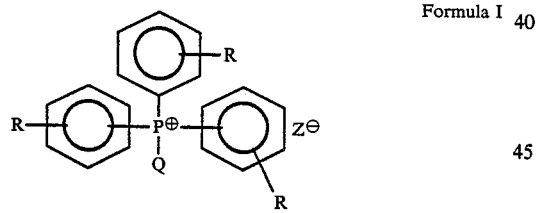

Formula I wherein Q is a cycloalkyl or alkyl or halo substituted cycloalkyl group having from about 3 to about 8 carbon atoms in the cycloalkyl ring; each R is independently hydrogen, a halogen, or a hydrocarbyl group having from 1 to about 12 carbon atoms; Z is an anion.

15. A process of claim 14 wherein (a) components (A) and (B) are employed in amounts which provide a ratio of phenolic hydroxyl groups to epoxy groups of fom about 0.2:1 to about 1.5:1.

(b) the triphenyl phosphonium catalyst, component (C), is employed in an amount of from about 0.0005 to about 0.05 mole of catalyst per mole of the epoxy resin, component (A);

(c) component (A) is an epoxy resin or mixture of epoxy resins represented by the formula III wherein each A is independently a divalent hydrocarbyl or substituted hydrocarbyl group having from 1 to about 6 carbon atoms; each X is independently hydrogen or a hydrocarbyl or substituted hydrocarbyl or hydrocarbyloxy or substituted hydrocarbyloxy group having from 1 to about 6 carbon atoms, chlorine or bromine; and n' has an average value from about 0.035 to about 0.1;

(d) component (B) is a compound or mixture of compounds represented by formula V wherein each A is independently a divalent hydrocarbyl or substituted hydrocarbyl group having from 1 to about 6 carbon atoms; and each X is independently hydrogen or a hydrocarbyl or substituted hydrocarbyl or hydrocarbyloxy or substituted hydrocarbyloxy group having from 1 to about 6 carbon atoms, chlorine or bromine; and (e) the catalyst, component (C) is a triphenyl phosphonium compound represented by formula I wherein Z is a halide, a carboxylate, a carboxylate.-carboxylic acid complex, a conjugate base of an inorganic acid, a conjugate base of a phenol, or a combination thereof.

16. A process of claim 15 wherein (a) components (A) and (B) are employed in amounts which provide a ratio of phenolic hydroxyl groups to epoxy groups of from about 0.5:1 to about 1:1;

(b) the triphenyl phosphonium catalyst, component (C), is employed in an amount of from about 0.001 to about 0.005 mole of catalyst per mole of the epoxy resin, component (A);

(c) component (A) is an epoxy resin or mixture of epoxy resins represented by formula III wherein each A is independently a divalent hydrocarbyl or substituted hydrocarbyl group having from 1 to about 3 carbon atoms; each X is independently hydrogen or a hydrocarbyl or substituted hydrocarbyl or hydrocarbyloxy or substituted hydrocarbyloxy group having from 1 to about 3 carbon atoms, chlorine or bromine; and n has a value of 1; and (d) component (B) is a compound or mixture of compounds represented by formula V wherein each A is independently a divalent hydrocarbyl or substituted hydrocarbyl group having from 1 to about 3 carbon atoms; each X is independently hydrogen or a hydrocarbyl or substituted hydrocarbyl or hydrocarbyloxy or substituted hydrocarbyloxy group having from 1 to about 3 carbon atoms, chlorine or bromine; and n has a value of 1; and (e) the catalyst, component (C) is a triphenyl phosphonium compound represented by formula I wherein Z is chloride, bromide iodide, acetate, or acetate.acetic acid complex.

17. A process of claim 13 wherein (a) the epoxy resin, component (A), is a diglycidyl ether of bisphenol A, a diglycidyl ether of bisphenol F, a diglycidyl ether of bisphenol K, a diglycidyl ether of bisphenol S or a mixture of such glycidyl ethers;

(b) the phenolic hydroxyl containing compound, component (B), is bisphenol A, bisphenol F, bisphenol K, bisphenol S or a mixture of such compounds; and (c) the catalyst, component (C), is cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium oxalate, cyclopentyl triphenyl phosphonium iodie, cyclopenyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium oxalate, or any combination thereof.

18. A process of claim 17 wherein
(a) the epoxy resin, component (A), is a diglycidyl ether of bisphenol A;
(b) the phenolic hydroxyl containing compound, component (B), is bisphenol A; and
(c) the catalyst, component (C), is cyclopentyl triphenyl phosphonium iodide, cyclopentyl triphenyl phosphonium bromide, cyclopentyl triphenyl phosphonium chloride, cyclopentyl triphenyl phosphonium acetate.acetic acid complex, cyclopentyl triphenyl phosphonium phosphate, cyclohexyl triphenyl phosphonium iodide, cyclohexyl triphenyl phosphonium bromide, cyclohexyl triphenyl phosphonium chloride, cyclohexyl triphenyl phosphonium acetate.acetic acid complex, cyclohexyl triphenyl phosphonium phosphate, or any combination thereof.

19. A process of claim 14 wherein
(a) the epoxy resin, component (A), is a diglycidyl ether of bisphenol A, a diglycidyl ether of bisphenol F, a diglycidyl ether of bisphenol K, a diglycidyl ether of bisphenol S or a mixture of such glycidyl ethers;
(b) the phenolic hydroxyl containing compound, component (B), is bisphenol A, bisphenol F, bisphenol K, bisphenol S or a mixture of such compounds; and
(c) the catalyst, component (C), is cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium oxalate, or any combination thereof.

20. A process of claim 19 wherein
(a) the epoxy resin, component (A), is a diglycidyl ether of bisphenol A;
(b) the phenolic hydroxyl containing compound, component (B), is bisphenol A; and
(c) the catalyst, component (C), is cyclopentyl triphenyl phosphonium iodide, cyclopentyl triphenyl phosphonium bromide, cyclopentyl triphenyl phosphonium chloride, cyclopentyl triphenyl phosphonium acetate.acetic acid complex, cyclopentyl triphenyl phosphonium phosphate, cyclohexyl triphenyl phosphonium iodide, cyclohexyl triphenyl phosphonium bromide, cyclohexyl triphenyl phosphonium chloride, cyclohexyl triphenyl phosphonium acetate.acetic acid complex, cyclohexyl triphenyl phosphonium phosphate, or any combination thereof.

21. A process of claim 15 wherein
(a) the epoxy resin, component (A), is a diglycidyl ether of bisphenol A, a diglycidyl ether of bisphenol F, a diglycidyl ether of bisphenol K, a diglycidyl ether of bisphenol S or a mixture of such glycidyl ethers;
(b) the phenolic hydroxyl containing compound, component (B), is bisphenol A, bisphenol F, bisphenol K, bisphenol S or a mixture of such compounds; and
(c) the catalyst, component (C), is cyclopropyl triphenyl phosphonium iodide, cyclopropyl triphenyl phosphonium bromide, cyclopropyl triphenyl phosphonium chloride, cyclopropyl triphenyl phosponium acetate, cyclopropyl triphenyl phosphonium acetate.acetic acid complex, cyclopropyl triphenyl phosphonium phosphate, cyclopropyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium oxalate, or any combination thereof.

22. A process of claim 21 wherein
(a) the epoxy resin, component (A), is a diglycidyl ether of bisphenol A;
(b) the phenolic hydroxyl containing compound, component (B), is bisphenol A; and
(c) the catalyst, component (C), is cyclopentyl triphenyl phosphonium iodide, cyclopentyl triphenyl phosphonium bromide, cyclopentyl triphenyl phosphonium chloride, cyclopentyl triphenyl phosphonium acetate.acetic acid complex, cyclopentyl triphenyl phosphonium phosphate, cyclohexyl triphenyl phosphonium iodide, cyclohexyl triphenyl phosphonium bromide, cyclohexyl triphenyl phosphonium chloride, cyclohexyl triphenyl phosphonium acetate.acetic acid complex, cyclohexyl triphenyl phosphonium phosphate, or any combination thereof.

23. A process of claim 16 wherein
(a) the epoxy resin, component (A), is a diglycidyl ether of bisphenol A, a diglycidyl ether of bisphenol F, a diglycidyl ether of bisphenol K, a diglycidyl ether of bisphenol S or a mixture of such glycidyl ethers;
(b) the phenolic hydroxyl containing compound, component (B), is bisphenol A, bisphenol F, bisphenol K, bisphenol S or a mixture of such compounds; and
(c) the catalyst, component (C), is cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium oxalate, or any combination thereof.

24. A process of claim 23 wherein
(a) the epoxy resin, component (A), is a diglycidyl ehter of bisphenol A;
(b) the phenolic hydroxyl containing compound, component (B), is bisphenol A; and
(c) the catalyst, component (C), is cyclopentyl triphenyl phosphonium iodide, cyclopentyl triphenyl phosphonium bromide, cyclopentyl triphenyl phosphonium chloride, cyclopentyl triphenyl phosphonium acetate.acetic acid complex, cyclopentyl triphenyl phosphonium phosphate, cyclohexyl triphenyl phosphonium iodide, cyclohexyl triphenyl phosphonium bromide, cyclohexyl triphenyl phosphonium chloride, cyclohexyl triphenyl phosphonium acetate.acetic acid complex, cyclohexyl triphenyl phosphonium phosphate, or any combination thereof.

* * * * *

UNITED STATES PATENT AND TRADEMARK OFFICE
CERTIFICATE OF CORRECTION

PATENT NO. : 4,808,692  PAGE 1 OF 2

DATED : February 28, 1989

INVENTOR(S) : Ha Q. Pham and Loan A. Ho

It is certified that error appears in the above-identified patent and that said Letters Patent is hereby corrected as shown below:

Col. 1, line 8; change "conerns" to --concerns--.

Col. 2, line 5; change "catalysts" to --catalyst--.

Col. 2, line 60; change "bis-" to -- bi- --.

Col. 3, line 19; change "halige" to --halide--.

Col. 5, line 63; delete the comma "," after "methyl".

Col. 5, line 66; change the 1st occurrence of "ether" to --ethyl--.

Col. 7, line 37; change "Table" to --Tables--.

Col. 7, line 50; change "millimore" to --millimole--.

Col. 7, line 58; change "millimore" to --millimole--.

Col. 7, line 62; change "Table" to --Tables--.

Col. 8, line 42; change "o" to --of--.

Col. 8, line 43; change "minutes" to --minute--.

Col. 8, line 62; change "determine" to --determined--.

Col. 10, line 5, second column of Table II; change "pheny" to --phenyl--.

UNITED STATES PATENT AND TRADEMARK OFFICE
CERTIFICATE OF CORRECTION

PATENT NO. : 4,808,692

DATED : February 28, 1989

INVENTOR(S) : Ha Q. Pham and Loan A. Ho

It is certified that error appears in the above-identified patent and that said Letters Patent is hereby corrected as shown below:

Col. 10, line 41; change "aaging" to --aging--.

Col. 12, line 68, Claim 3; change "carboxyl" to --carboxylic--.

Col. 14, line 27, Claim 7; insert a comma --,-- after "bromide".

Col. 16, line 50, Claim 13; change "fom" to --from--.

Col. 17, line 57, Claim 15; change "fom" to --from--.

Col. 19, line 9, Claim 17; change "iodie" to --iodide--.

Col. 19, line 9, Claim 17; change "cyclopenyl" to --cyclopentyl--.

Signed and Sealed this

Sixth Day of March, 1990

Attest:

JEFFREY M. SAMUELS

*Attesting Officer*

*Acting Commissioner of Patents and Trademarks*